United States Patent [19]
Wiegand

[11] 3,783,249
[45] Jan. 1, 1974

[54] CODED MAGNETIC CARD AND READER

[75] Inventor: John Richard Wiegand, Valley Stream, N.Y.

[73] Assignees: Milton Velinsky, Plainfield, N.J.; John R. Wiegand, Valley Stream, N.Y. ; part interest to each

[22] Filed: Oct. 13, 1971

[21] Appl. No.: 189,027

Related U.S. Application Data

[63] Continuation-in-part of Ser. No. 5,632, Jan. 26, 1970, abandoned.

[52] U.S. Cl. ..................235/61.11 D, 235/61.12 M, 340/174.1 H
[51] Int. Cl. ..........................G06k 7/08, G11b 5/00
[58] Field of Search ..............235/61.11 R, 61.11 D, 235/61.12 R, 61.12 M, 61.12 N, 61.7 B; 340/174.1 G, 174.1 H, 149 A

[56] References Cited

UNITED STATES PATENTS

| | | | |
|---|---|---|---|
| 3,215,903 | 11/1965 | Barney | 235/61.11 D |
| 3,419,710 | 12/1968 | Mathews, Jr. et al. | 235/61.11 D |
| 3,453,598 | 7/1969 | Schweizer | 340/149 |

*Primary Examiner*—Daryl W. Cook
*Attorney*—Laurence R. Hefter et al.

[57] ABSTRACT

A coded pulse generation system includes a coded card and card reader. The card has a plurality of axially straight helically twisted magnetic wires disposed parallel to each other transversely of the card. Some of the wires may have polarities reversed from the remaining wires and may be disposed between two opaque layers. The card reader has a fixture including two spaced walls defining a slot into which the card is inserted. Permanent magnets and magnetic cores wound with wire coils are mounted on the walls of the fixture. While the card is being inserted into the slot, sequentially the magnetic state of each wire changes instantaneously generating a pulse in the coils.

14 Claims, 10 Drawing Figures

CODED MAGNETIC CARD AND READER

This is a continuation-in-part application of copending patent application Ser. No. 5,632 filed Jan. 26, 1970, now abandoned, entitled "Coded Magnetic Card and Reader".

This invention relates to the art of coded data cards and devices for reading the cards and, more particularly, concerns a magnetically coded data card and a card reader which magnetically reads the data card.

Data cards heretofore used generally have holes in or marks on the card which are mechanically, electrically, optically or magnetically scanned. The coding of the card is exposed. It is thus subject to accidental or deliberate alteration. Such cards usually require special, complex and expensive punching or printing equipment to apply the coding to the card. The devices required for reading the prior coded cards are also complex and expensive. Some require skilled operators. This situation precludes the setting up of systems in stores, factories, offices and elsewhere requiring a multiplicity of card reading stations which can feed data read from coded cards to a central computer or data processing center.

The present invention is directed at overcoming the above and other difficulties and disadvantages of prior coded cards and card readers, by providing both a card which may have a secret unalterable coding, and a magnetic card reader of simplified structure. According to the invention, each coded card contains short pieces of specially processed wires. Each of the wires causes production of an electrical output pulse as the card is inserted into the card reader. The pulses may be either positive or negative in polarity depending on the orientation of the wires in the card. The card reader comprises several permanent magnets mounted on a wall of a slotted fixture. Small coils are connected to an output terminal of the card reader. When a coded card is inserted into the fixture, the wires in the card come under the influence of the magnetomotive force flux fields maintained by the magnets. As the card is inserted each wire is subjected to a magnetoforce field of increasing intensity until at a critical point magnetic domains in the wire snap into a linear direction compatible with the surrounding flux field. The instantaneous rate of change of flux caused by the sudden change of magnetic state of the wire is relatively quite large and causes generation of a sharp spike of electromotive force in the adjacent coils. This spike appears as a sharply peaked voltage pulse at the output terminal of the card reader. The magnetic snap of each wire occurs at a different discrete time from the magnetic snap of all other wires. Thus successive pulses produced as the card is inserted into the card reader are separate so that undesired merging of any two or more successive pulses is prevented. A train of electrical pulses is thus produced at the output terminal of the card reader as the card is inserted. The energy for generating the train of pulses is derived from the mechanical motion of the card while it is being inserted into the card reader. The number and polarity of pulses produced are unique for each coded card.

It will be noted that the card reader employs no moving parts. It contains no electronic circuits for scanning, data sequencing or interpretation. There are no mechanical scanning fingers. There are no electronic tubes or transistors. There are no printed or integrated circuits. The card reader requires no power supply. The simplified structure of the card reader and the permanent nature of the data coding of the card make it possible to set up a large system having a multiplicity of card reading stations all feeding data to a single signal processor. The output of the signal processor can be used to activate any one or more of an infinite variety of devices such as door locks, telephone circuits, lamps, etc. The signal outputs can be used to record the arrival or departure of an employee at a work station, to identify customers charging a purchase at a store, or to perform automatically and electronically an infinite variety of other tasks heretofore performed manually.

The invention will be explained in further detail in connection with the drawings, wherein.

Detailed Description

Figure 2:
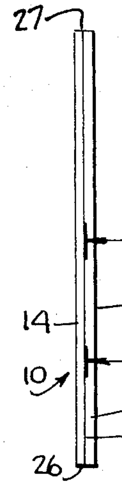
FIG. 2 is an edgewise view of the card taken on line 2—2 of FIG. 1.

Before discussing the details of the present invention, it is important that one understands the structure and operation of the primary element of the coded data card of this invention. To this end reference is made to U.S. Patent application Ser. No. 173,070, filed Aug. 19, 1971, now abandoned, entitled Self-Nucleating Magnetic Wire and filed by the inventor of the present invention. The subject matter of that co-pending application is incorporated herein. For facilitating understanding of this invention a brief description of the self-nucleating magnetic wire follows.

A magnetizable wire is treated to form a shell and central core, the shell having the capacity to be permanently magnetized in an axial direction and having high coercivity. The core has a relatively low coercivity. Such a wire can be formed by drawing a wire of ferromagnetic material such as a nickel-iron alloy and work-hardening the wire such as by circumferentially straining it to form a relatively "hard" magnetic wire shell having relatively high magnetic retentivity and coercivity. The wire has a relatively "soft" magnetic core having a relatively low coercivity. Both the shell and the core are magnetically anisotropic with an easy axis of magnetization parallel to the axis of the wire. The wire is then magnetized by subjecting it to an external magnetic field. The relatively hard shell has a retentivity and coercivity sufficiently greater than that of the relatively soft core so that when the external magnetic field is removed the shell retains its charge and couples or "captures" the core by magnetizing the core in an axial direction opposite to the direction of magnetization of the shell. In this fashion the core forms a magnetic return path or shunt for the shell and a domain wall interface is formed between the core and shell.

When the wire is subjected to an external magnetic field of greater magnitude than the field of the shell and having a polarity opposite to that of the shell, such as by bringing a permanent magnet into close proximity to the wire, the external field to which the wire is subjected increases until a point is reached at which time the external magnet captures the core from the shell by abruptly reversing the flux direction of the core through the process of nucleation of a magnetic domain. Reversal of the field direction of the core results in an abrupt change in the magnetic flux surrounding the wire. when the permanent magnet is removed from the vicinity of the wire, the shell recaptures the core providing an additional abrupt change in the magnetic flux surrounding the wire. In general, the rate of propagation of the domain wall along the wire is a function of the wire composition, metallurgical structure, diameter and length and of the strength of the external magnetic field. A coil placed adjacent to the wire will have a current pulse induced therein by this abruptly changing magnetic field and that current pulse may then be utilized as described below.

FIGS. 1–4 illustrate a preferred form of coded data card 10. The card is made of two layers of sheets of opaque plastic, paper, cardboard or other suitable material. The layers 12, 14 may be secured together by cement or, in the case of thermoplastic material, they may be bonded together by heat sealing. Between the layers is a plurality of self-nucleating magnetic wires 22, 24 of two different polarities shown disposed axially parallel to each other and perpendicular to the longer dimension of length of the card. Wires of different polarities are shown as having different lengths but they may actually be formed with the same length. The wires are held in place by an adhesive or they may be placed in preformed grooves 36. Ends of the wires are spaced from opposite long edges 25 of the card. The wires extend transversely of the card parallel to the shorter edges 26, 27. Centers of the wires preferably lie on the central line of symmetry of the card bisecting the width of the card. The longer wires 22 have a length which is much more than one half the width of the card while the shorter wires 24 are less than half the width of the card. Stated another way, the longer wires have a length which is a relatively large percentage of the width of the card, while the shorter wires have a length which is a significantly smaller percentage of the width of the card. The wires are disposed closer to one end of the card 10, that is they are closer to edge 26 than to edge 27. On one or both faces of the card are legends 30, 32 and arrow 34 indicating the manner in which the card is to be inserted into the card reader 50 described below.

The number of wires 22, 24 and their polarities determine the code of the card 10. The coding is secret because the wires 22, 24 are concealed inside the card. The coding is permanent and cannot be easily defaced or altered since it is determined by the number and arrangement of the wires inside the card. The card can be made manually if desired, or by mass production high speed machinery.

Figure 7:
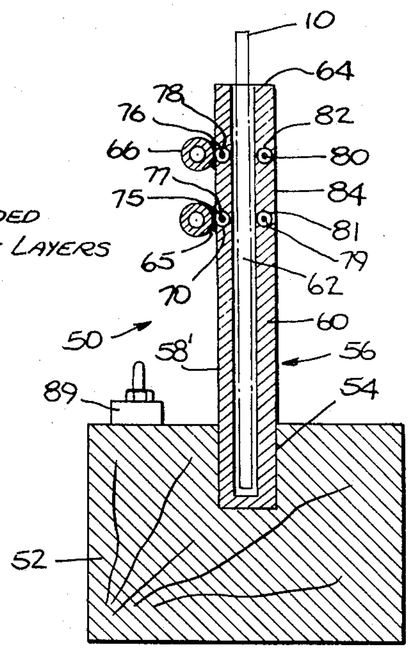
FIG. 7 is a vertical sectional view taken on line 7—7 of FIG. 5.
Figures 3, 8:
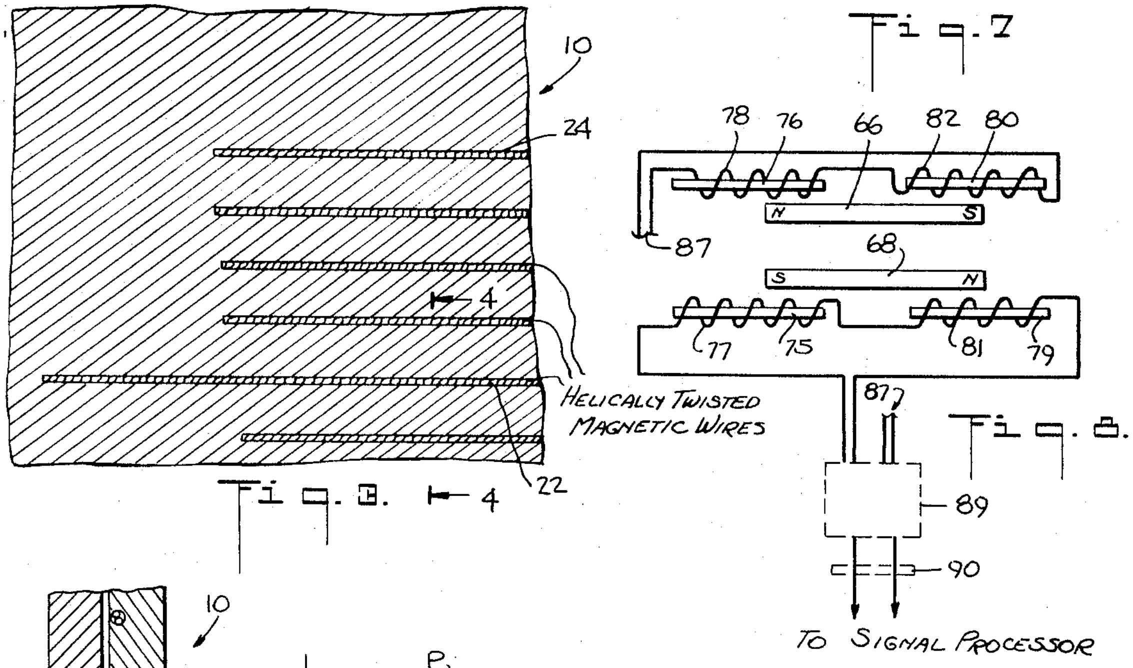
FIG. 3 is an enlarged fragmentary sectional view taken on line 3—3 of FIG. 2.
FIG. 8 is a schematic circuit diagram of the card reader.
Figure 4:
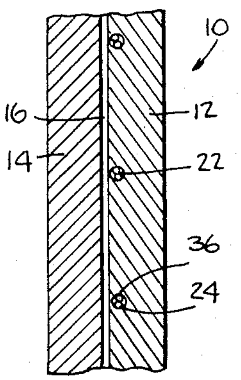
FIG. 4 is a further enlarged fragmentary sectional view taken on line 4—4 of FIG. 3.
Figures 5, 6:
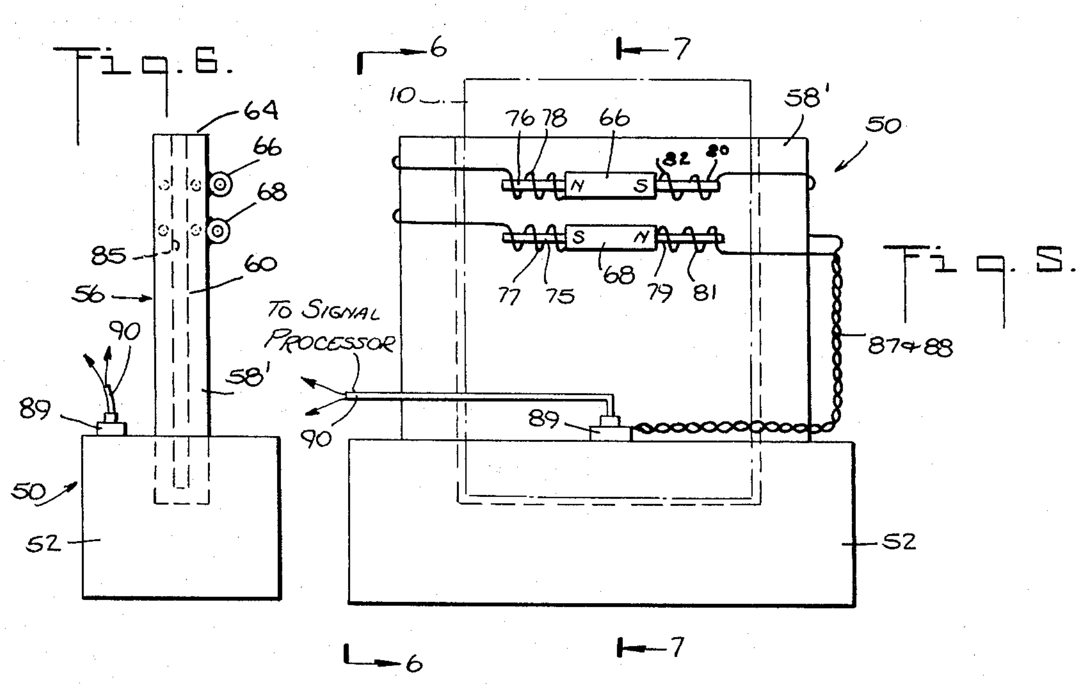
FIG. 5 is a side elevational view partially diagrammatic in form of a card reader according to the invention.
FIG. 6 is an end elevational view taken on line 6—6 of FIG. 5.

FIGS. 5–7 show a magnetic card reader 50 formed in accordance with this invention. The card reader has a rectangular base 52 provided with a groove 54 in which is set a flat fixture 56. This fixture has two spaced, flat walls 58, 60 defining a slot 62 therebetween. The slot is shorter in length than the card 10, so that one end of the card will project out of the upper end 64 of the fixture as indicated by dotted lines in FIGS. 5 and 7. The width of the slot is slightly larger than the width of the card 10. The slot is open at the upper end 64 of the fixture to permit free insertion and removal of card 10. Near the top of wall 58 is secured by cement 65 a pair of axially parallel minature permanent magnets 66, 68. The magnets may be tubular or solid members, and can be round or rectangular in cross section. The axes of the magnets are parallel to the surfaces of walls 58, 60 and are oriented horizontally parallel to the top of the fixture. Their polarities are reversed with the north pole of each magnet aligned with the south pole of the other magnet. The north and south magnetic vectors of the magnets extend in opposite horizontal directions. These vectors are oriented parallel to the transversely extending wires 22, 24 when a card 10 is inserted into the fixture.

It is important that the lines of flux of each magnet 66, 68 extend into the slot 62 so they can act upon the wires 22, 24 of the card 10. Furthermore, the strength of each of the magnets 66, 68 is such that the magnetic field intensity within the slot 62 for each magnet is of sufficient magnitude that the core of each wire in the card 10 will be captured by one of the permanent magnets 66, 68 as the wires approach the magnets. Toward this end, the permanent magnets 66, 68 are spaced sufficiently to avoid having the permanet magnets serve as shunts for each other and reduce the field intensity within the slot 62. The magnets 66, 68 have reversed polarities so that the core of each of the wires 22, 24 will be captured by one of the magnets since the wires may have reversed polarities depending upon the code of the particular card 10.

On side wall 58 preferably set in grooves 70 are two iron cores 75, 76 having insulated wire coils 77, 78 wound around them. On opposite side wall 60 are further iron cores 79, 80 wound with wire coils 81, 82 and set in grooves 84. Cores 75 and 79 are axially parallel to each other and to the axis of magnet 68 and are aligned with the magnet 68. Cores 76 and 80 are similarly arranged with respect to the magnet 66. The coils 78 and 82 are joined by a jumper wire 85 and coils 77 and 81 are joined by a jumper wire 86 in a series arrangement to provide two signal circuits 87, 88 as shown diagrammatically in FIG. 8. One circuit 87 provides a signal produced by the magnet 66 and the other circuit 88 provides a signal produced by the magnet 68, each corresponding to a wire of a particular polarity. The circuits 87, 88 are connected to an output terminal 89 mounted on base 52. Cable 90 extends from the terminal 89 to a signal processor shown diagrammatically in FIG. 9 and described below.

In operation, a card 10 is inserted into the slot 62 in fixture 56 of the card reader 50. This motion of insertion effectively causes the magnetic field in the slot 62 for each permanent magnet 66, 68 to scan across the wires 22, 24. The wires 22, 24 have previously been placed on the card 10 according to a particular pattern which provides a unique code. The code is formed by the number of wires and their relative polarities. For example, the card illustratd in FIG. 1 has a pattern in which two wires 22 (the longer wires) have one polarity alignment and the remaining nine wires 24 (the shorter wires) have the opposite polarity. The "polarity of the wires" actually refers to the polarity of the shell of the wire which reamins unchanged. Before the wire is exposed to the magnetic field of the permanent magnets 66, 68 the polarity of the core of the wire is determined by the shell and reversed to that of the shell.

Figure 10:
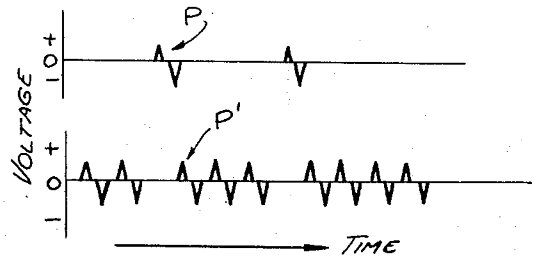
FIG. 10 is a pulse diagram used in explaining the operation of the invention.

As each wire approaches the point of maximum intensity of the flux field of the permanent magnet whose polarity is opposite that of the wire that permanent magnet (66 or 68) captures the core from the shell and abruptly reverses the polarity of the core snapping it into proper alignment with the magnetic field in which it is immersed. As the wire leaves the point of maximum field intensity the shell recaptures the core. These abrupt changes significantly vary the magnetic field in the vicinity of the coils 78, 82 or coils 77, 81 producing a pair of sharp electrical pulses in one of these pairs of coils and its associated circuit 87 or 88 which is read at the terminal 89. The peak amplitude of these pulses is large enough to well exceed any ambient or spurious noise level. The pulses are sharp, narrow and distinctly separate from each subsequent and preceding pulse generated by magnetic snapping of other wires in the card. To ensure that a pair of pulses will be produced only in the circuit corresponding to the magnet producing the pulses the pairs of coils (77, 81 and 78, 82) are separated vertically sufficiently so that each is not affected or only slightly affected by the changing field produced by the magnet corresponding to the other coil pair. FIG. 10 indicates a possible sequence of pulses P, P′ generated by card 10, the pulses P being generated by the longer wires 22 and the pulses P′ being generated by the shorter wires 24. This sequence may represent the code +1,+1,+1,+1,−1,+1,+1,+1,−1,+1,+1. This can be interpreted as the base 10 number 432. This sequence is produced by only 11 sections of wire as shown in FIG. 1.

The group of wires 22, 24 are mounted in the lower part of the card so that when the card has descended to the bottom of slot 62, all the wires have passed well below the bottom magnet 68. The upper end of the card extends out of the fixture so that it can easily be grasped and pulled. When the card is pulled out, another series of pulses will be generated identical to those indicated graphically in FIG. 10 but the order of generation will be reversed. This second series of pulses can be used for checking purposes at the signal processor. The number generated when the card was inserted can be compared with the number generated backwards when the card was removed to check for errors. It is of course possible to eliminate the second series by extending the slot 62 entirely through the fixture and base so that the card drops through the slot into a suitable receptacle below or by designing the reader so that the card 10 is moved horizontally through the slot 62 from one side to the other.

Figure 9:
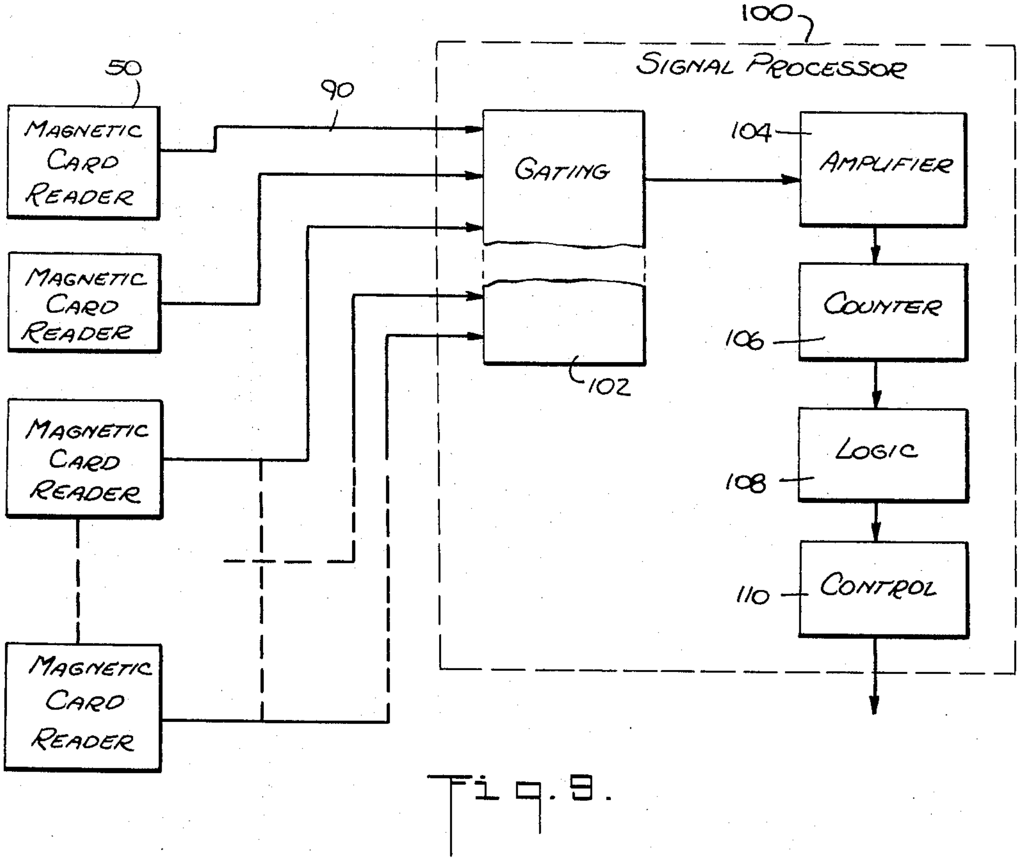
FIG. 9 is a block diagram of a data processing system including a plurality of card readers and a signal processer.

FIG. 9 shows a signal processor 100 to which cables 90 from a pluraltiy of magnetic card readers are connected. The processor includes a gating circuit 102 which passes the pulses from each card reader to amplifier circuitry 104. The amplified pulses pass to counters 106 which actuate appropriate logic circuitry 108. The logic circuitry actuates control circuitry 110 which applies appropriate output signal to an application device such as a door lock, telephone, alarm, register, etc. This arrangement creates a man-machine or input-computer interface of extremely high reliability. In a typical application, a multiplicity of card readers can be located at different card reading stations, such as entrances to a building. Each station will be connected to the central signal processor 100 by a cable. If these cables are reasonably short, no amplifier or line driver will be required, because of the high signal-to-noise ratio of the pulses generated by the card readers.

Figure 1:
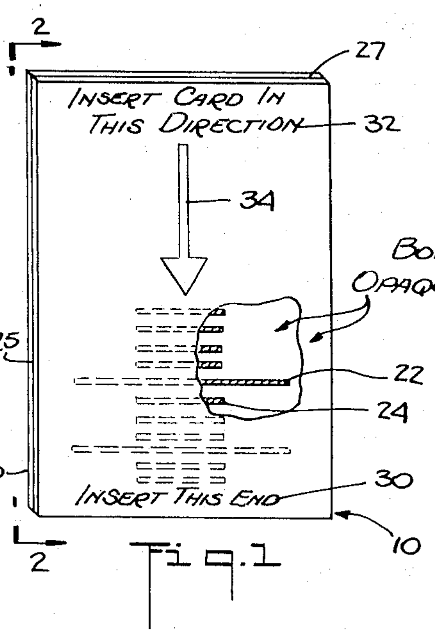
FIG. 1 is an oblique side view of a data card according to the invention, a portion of a side layer of the card being broken away.

The pulse sequence illustrated in FIG. 10 and which corresponds to the card 10 of FIG. 1 depicts a particular time sequence which can be obtained by proper spacing of the wires 22, 24 taking into account the spacing between the permanent magnets 66, 68. Of course, with different spacing between the wires 22, 24 the relative location of the pulses P with respect to the pulses P′ may be different. However, by programming the signal processor 100 to account for the particular spacing between the wires 22, 24, the code formed by the arrangement of wires will be properly read and acted upon.

The characteristics of the data card may be summarized as follows. The card is small, durable and convenient to carry. The card has a number of sections of helically twisted magnetic wire. The length, positioning, separation and orientation of the wires in the card determines the code of the card. The coding of the card is concealed and protected between opaque layers. The card is easy to make and can be fabricated by a layman provided with an appropriate kit of parts. The code is read by an appropriate magnetic card reader. Despite its simplicity the information content of the card can be quite large because two sets of pulses can be obtained by the judicious selection and placement of wires in the card. As one example, the signal processor could interpret the one set as counts and the other set as digit shifts. Of course cards can be coded in other ways. Rather than spacing wires equally variable spacings can be provided between wires or groups of wires. This may require a more elaborate signal processor since the time length of the gap will be determined by the rate of insertion of the card into the card reader. Since the card will usually be dropped into the slot the acceleration of each wire through the magnetic field will be more constant than its velocity, depending upon friction. A three dimensional matrix with huge data storage capability is rendered possible. The mutually perpendicular X, Y and Z coordinates could represent respectively the positive pulses, the negative pulses and the gaps between pulses. Other codes are of course possible, being limited only by the needs of the user and capabilities of the signal processor.

It should be understood that as the data card is inserted into the fixture 56, the wires 22, 24 come under the influence of the magnetomotive force fields caused by the permanent magnets. Many of these lines of flux, though possibly not straight, will predominately flow in a direction parallel to the main axis of the wire as they proceed from the magnet's north to south poles. There are at least two such magnets which will in turn override the effects of the other, for any particular wire depending on the instantaneous depth of insertion of the card. The predominately parallel flux paths emanating from the two magnets will be in opposite directions. In addition there will be lines of flux that the sections of wire, particularly the longer ones, will cut as the card insertion progresses. Generally, these latter flux lines will be flowing from one magnetic pole to the opposite pole of the other magnet, rather than between the opposite poles of the same magnetic.

Each wire will have an easy quiescent path of complex, generally helixical shape caused by its simple but special processing. Unprocessed wire will not perform at all adequately. When the impinging magnetomotive force field becomes of sufficient intensity the magnetic domains of the self nucleating wire will snap into a linear direction compatable with the surrounding flux flow it is immersed in. This snap will be detected by the sensing coils mounted on the fixture. Since this switching was regenerative the "instantaneous" rate of change of flux will be quite large, resulting in a sharp spike of electromotive force in the coils. This will give an output of excellent signal-to-noise ratio.

Meanwhile, the other sections of wire, though possibly tightly packed on a two dimensional plane with parallel axes, are not perfectly co-located. They are therefore further down on the curve of magnetic field buildup. Besides this, the snap of that one wire will effectively short circuit the intensity of the field for the following sections of wire. This will provide good separation of the pulses, as the insertion of the card into the fixture progresses, with respect to the width of the output pulses. Such a phenomena will then prevent the undesired merging of two pulses which could cause an ambiguous output.

The characteristics of the card reader may be summarized as follows. The card reader comprises primarily permanent magnets although DC electromagnets could be used, core-wound coils, and a slotted fixture for inserting the coded card. The components of the reader are so assembled as to sequentially impose a magnetomotive force field upon the wires of the card as it is inserted into the slot. The force field causes the magnetic domains of the wires to reverse their polarity into an orientation compatible with the force field. The realignment of magnetic domains is regenerative and therefore collectively quite rapid within each individual wire. This switching action causes a sharp change of localized flux density in and immediately around each wire thereby causing a relatively large electromotive force in the sensing coils. The motion of the card into the slot creates the relative effect of scanning sequentially the magnetomotive force field through the wires. The scanning action produces a series of electromotive force output pulses, one for each wire. The coding of the card determines the number of output pulses, their peak amplitude, polarity and relative timing separation.

The output amplitude of the pulses is largely independent of the rate of motion of the card into the card reader. The magnetic domain switching action by its very nature tends to separate the pulses despite the possible close proximity of wires on the card. The separation of the output pulses prevents the transmission of an ambiguous code. The signal to noise ratio of the output pulse train produced by such actions is quite high. These characteristics enable the output pulses to be used without amplification of line drivers for reasonable lengths of interconnecting cables. The information content of the cards can be quite high by employing dual polarity capability (such as using positive pulses for counting and negative pulses for digit shifts). The power required for operation of the magnetic card reader is derived from the motion of the card as it is inserted or dropped into the slot. One or more magnetic card readers can be electrically connected with a simple signal return to a central signal processor for interpretation of the output. The signal processor can be programmed to initiate desired actions in accordance with the codes built into the cards. When the cards are removed from the slotted fixture, the code can be retransmitted in reverse sequence. This reverse reading of the card can be employed as a data check. The magnetic card reading stations of the system are simple, inexpensive, completely solid state, reliable and require no power supply. Use of electronic and eletrooptical scanning and sensing circuits is avoided. The signal processor can serve to store data, to initiate the unlocking or locking of doors, dialing of telephones, registering reporting times of employees, registering the status of an assembly on a production line, in dicating the validity status of a credit card, or a host of other applications requiring distinctive identification in an input-computer interface.

While a single embodiment and a number of possible variations have been described, it will be understood that many more modifications are possible within the scope of the invention.

What is claimed as new and desired to be secured by Letters Patent of the United States is:

1. A coded magnetic pulse generator comprising a holder, a plurality of wires mounted on the holder, each wire having a shell and core capable of being magnetized to a first level in a first axial direction when subjected to a first magnetic field having a strength greater than said first level, the direction of magnetization of only one of said shell and core being reversed upon removal of said first magnetic field, the direction of magnetization of said one of said shell and core being returned to said first direction when the wire is subjected to a second magnetic field having the same direction as said first magnetic field and a magnitude greater than said first level, each of said wires being magnetized to said first level and placed on the holder so that the first axial direction of magnetization of the wires relative to each other is in accordance with a predetermined code, whereby when the holder is moved through the second magnetic field the direction of magnetization of said one of said shell and core of each wire returns to said first axial direction in accordance with the predetermined code.

2. A coded magnetic pulse generator as defined in claim 1 wherein the first axial direction of at least one of the wires is opposite to the first axial direction of the other wires.

3. A coded magnetic pulse generator as defined in claim 2 wherein the wires are axially parallel to each other and are laterally spaced apart.

4. A coded magnetic pulse generator as defined in claim 1 wherein the holder is formed of a pair of juxtaposed sheets, the wires being disposed between the sheets.

5. A coded magnetic pulse generator as defined in claim 4 wherein the wires are axially parallel to each other and laterally spaced apart and wherein the first axial direction of at least one of the wires is opposite to the first axial direction of the other wires.

6. In combination, a. a coded magnetic pulse generator comprising a holder, a plurality of wires mounted on the holder, each wire having a shell and core capable of being magnetized to a first level in a first axial direction when subjected to a first magnetic field having a strength greater than said first level, the direction of magnetization of only one of said shell and core being reversed upon removal of said first magnetic field, the direction of magnetization of said one of said shell and core being returned to said first direction when the wire is subjected to a second magnetic field having the same direction as said first magnetic field and a magnitude greater than said first level, each of said wires being magnetized to said first level and placed on the holder so that the first axial direction of magnetization of the wires relative to each other is in accordance with a predetermined code, and b. a reader for reading said pulse generator comprising means for producing said second magnetic field and means for sensing a change in the magnetic flux adjacent to the magnetic means, the sensing means providing a signal corresponding to the predetermined code, whereby when the holder is moved through the second magnetic field the direction of magnetization of said one of said shell and core of each wire returns to said first axial direction in accordance with the predetermined code.

7. The combination of claim 6 wherein the sensing means includes a coil of conductive wire mounted adjacent the magnetic means.

8. The combination of claim 6 wherein the magnetic means includes a pair of magnets of opposite polarity.

9. The reader of claim 8 including means for receiving the coded magnetic pulse generator in a particular direction and wherein the pair of magnets are spaced apart in a direction parallel to said particular direction, the magnets being mounted on the reader such that the coded magnetic pulse generator passes through the second magnetic field as it is inserted into the receiving means.

10. The reader of claim 9 wherein a first wire having a particular polarity alignment produces a first signal and a second wire having a polarity alignment opposite to the first wire produces a second signal.

11. The reader of claim 9 including at least two coils of conductive wire, one coil being mounted adjacent to each of the magnets.

12. The reader of claim 11 wherein the coils are spaced apart sufficiently such that the change in magnetic flux produced by a wire becoming juxtaposed to one of the magnets produces a signal greater than a predetermined magnitude in the coil adjacent to said one of the magnets and produces a signal less than a predetermined magnitude in the coil adjacent to the other of the magnets.

13. The reader of claim 9 wherein the means for receiving the coded magnetic pulse generator comprises a pair of spaced walls defining a slot, and wherein the sensing means includes at least one coil of conductive wire, the magnets being mounted on the reader to provide the second magnetic field within the slot and the coil being mounted on the reader so as to be disposed within the changing magnetic field produced when the direction of magnetization of said one of said shell and core of one of the wires on the pulse generator is reversed.

14. The reader of claim 13 including at least two coils of conductive wire, one coil being mounted adjacent to each of the magnets, the coils being spaced apart sufficiently such that the change in magnetic flux produced by a wire becoming juxtaposed to one of the magnets produces a signal greater than a predetermined magnitude of the coil adjacent to said one of the magnets and produces a signal less than a predetermined magnitude in the coil adjacent to the other of the magnets.

* * * * *